United States Patent
Liang et al.

(10) Patent No.: US 11,505,219 B2
(45) Date of Patent: Nov. 22, 2022

(54) COMBINED DEVICE HAVING DEVICE FOR CONNECTING CROSS BEAM FOR RECEIVING PIVOT PINS AND TWO LOWER LONGITUDINAL BEAMS OF COACH BODY FOR RAIL VEHICLE

(71) Applicants: CRRC QINGDAO SIFANG CO., LTD., Shandong (CN); CG RAIL—CHINESISCH-DEUTSCHES FORSCHUNGS- UND ENTWICKLUNGSZENTRUM FüR BAHN- UND VERKEHRSTECHNIK DRESDEN GMBH, Dresden (DE)

(72) Inventors: Jianying Liang, Shandong (CN); Chongcheng Zhong, Shandong (CN); Jiajie He, Shandong (CN); Junhai Liang, Shandong (CN); Jian Du, Shandong (CN); Dawei Ruan, Shandong (CN); Werner Hufenbach, Dresden (DE); Andreas Ulbricht, Dresden (DE)

(73) Assignees: CRRC QINGDAO SIFANG CO., LTD., Shandong (CN); CG RAIL—CHINESISCH-DEUTSCHES FORSCHUNGS- UND ENTWICKLUNGSZENTRUM FÜR BAHN- UND VERKEHRSTECHNIK DREDEN GMBH, Dresden (DE)

( * ) Notice: Subject to any disclaimer, the term of this patent is extended or adjusted under 35 U.S.C. 154(b) by 545 days.

(21) Appl. No.: 16/484,661

(22) PCT Filed: Feb. 7, 2018

(86) PCT No.: PCT/EP2018/053048
§ 371 (c)(1),
(2) Date: Aug. 8, 2019

(87) PCT Pub. No.: WO2018/146132
PCT Pub. Date: Aug. 16, 2018

(65) Prior Publication Data
US 2020/0039539 A1    Feb. 6, 2020

(30) Foreign Application Priority Data

Feb. 9, 2017    (DE) .................. DE10 2017 102 561

(51) Int. Cl.
*B61D 17/00*    (2006.01)
*B61F 1/12*    (2006.01)
(Continued)

(52) U.S. Cl.
CPC .............. *B61D 17/005* (2013.01); *B61F 1/12* (2013.01); *F16B 5/07* (2013.01); *B61F 1/14* (2013.01);
(Continued)

(58) Field of Classification Search
CPC ........ F16B 5/0642; F16B 5/0241; F16B 5/07; B61F 1/12; B61F 1/14; B61F 5/523; B61D 17/005
(Continued)

(56) References Cited

U.S. PATENT DOCUMENTS 1,985,582 A * 12/1934 Schwinger ............... F21V 21/34
248/343
2,405,269 A * 8/1946 Prutsman .................. E06C 7/44
182/205

(Continued)

FOREIGN PATENT DOCUMENTS

CH          700850 A1    10/2010
CN       201610139 U     10/2010
(Continued)

OTHER PUBLICATIONS

International Search Report for PCT/EP2018/053048 dated May 11, 2018 , ISA/CN.
(Continued)

*Primary Examiner* — Christopher M Koehler
(74) *Attorney, Agent, or Firm* — Yue (Robert) Xu; Apex Attorneys at Law, LLP

(57) ABSTRACT

A device for connecting a cross member for receiving pivot pins on two lower longitudinal members of a car body for a rail vehicle. The cross member has a transversal part that connects the two longitudinal members to each other in the region of the connection, and a longitudinal part that extends to the closest car front. The lower longitudinal members extend over the complete length of the car body and consist of multi-chamber hollow profiles made of a fibre composite material. The number of chambers of the multi-chamber hollow profile of each longitudinal member is reduced in the region of the connection such that the wall material of at least one chamber was removed in such a way that the webs to the adjacent chambers are exposed. At these places, load-introducing elements engage, to which load-introducing elements the cross member is attached.

18 Claims, 8 Drawing Sheets

(51) Int. Cl.
| | | |
|---|---|---|
| *F16B 5/07* | (2006.01) | |
| *B61F 1/14* | (2006.01) | |
| *E04D 3/366* | (2006.01) | |
| *F16B 5/02* | (2006.01) | |
| *F16B 5/06* | (2006.01) | |

(52) U.S. Cl.
CPC ............ *E04D 3/366* (2013.01); *F16B 5/0241* (2013.01); *F16B 5/0642* (2013.01)

(58) Field of Classification Search
USPC ........ 29/466, 525.13, 525.02, 525.11, 897.2; 403/87, 109.1, 83, 104, 107
See application file for complete search history.

(56) References Cited

U.S. PATENT DOCUMENTS

| | | | | |
|---|---|---|---|---|
| 5,407,310 | A | * | 4/1995 | Kassouni ................ B29C 70/76 29/525.02 |
| 5,537,793 | A | * | 7/1996 | Murasaki .................. F16B 5/07 52/585.1 |
| 5,623,742 | A | * | 4/1997 | Journee ..................... B60S 1/34 15/250.34 |
| 5,855,174 | A | | 1/1999 | Thoman et al. |
| 2011/0005424 | A1 | * | 1/2011 | Stiedl ........................ B61F 1/12 105/157.1 |
| 2014/0292013 | A1 | * | 10/2014 | Colombo .............. F16B 5/0628 296/29 |
| 2015/0104632 | A1 | * | 4/2015 | Dyllong .................... B64C 3/26 428/223 |
| 2015/0210297 | A1 | | 7/2015 | Langert |
| 2018/0043907 | A1 | | 2/2018 | Hirashima et al. |
| 2018/0155949 | A1 | * | 6/2018 | Zarnani ..................... E04B 1/98 |

FOREIGN PATENT DOCUMENTS

| | | |
|---|---|---|
| CN | 101952155 A | 1/2011 |
| CN | 105667531 A | 6/2016 |
| DE | 102012214162 A1 | 6/2014 |
| DE | 112013002072 T5 | 1/2015 |
| EP | 0836976 A1 | 4/1998 |
| EP | 0926036 A1 | 6/1999 |
| EP | 2110291 A2 | 10/2009 |
| GB | 2030934 A | 4/1980 |
| GB | 2514516 A | 11/2014 |
| JP | H01145259 A | 6/1989 |
| JP | 2000511134 A | 8/2000 |
| JP | 2009255641 A | 11/2009 |
| JP | 2014108635 A | 6/2014 |
| KR | 100758140 B1 | 9/2007 |
| TW | 201634321 A | 10/2016 |

OTHER PUBLICATIONS

The Chinese 1st Office Action dated Jun. 1, 2020 for Chinese Application No. CN201880010101.3.
The Japanese 1st Office Action dated Sep. 7, 2020 for Japanese Application No. JP2019-543081.

* cited by examiner

COMBINED DEVICE HAVING DEVICE FOR CONNECTING CROSS BEAM FOR RECEIVING PIVOT PINS AND TWO LOWER LONGITUDINAL BEAMS OF COACH BODY FOR RAIL VEHICLE

This application is a National Phase entry of PCT Application No. PCT/EP2018/053048, filed on Feb. 7, 2018, which claims the priority of German patent application No. DE 10 2017 102 561.8 filed on Feb. 9, 2017, the entire disclosures of the applications are incorporated herein by reference.

FIELD

The invention relates to a device for connecting a cross beam for receiving pivot pins to two lower longitudinal beams of a coach body for a rail vehicle. The rail vehicle is to be suitable in particular for use in short distance operation, such as in underground and suburban railways, in which the rail vehicles or the train units formed of them need to be speeded up and slowed down at short intervals.

BACKGROUND

Known coach bodies of rail vehicles, in a conventional design, consist of a tubular construction with two end walls which as a rule are formed as a transition to an adjacent coach body. Alternatively, the end wall can also be formed as a driver's cab.

In a conventional design, the coach body consists of an underframe (also called undercarriage), two side walls and a roof. The assemblies, in particular the side walls and the roof, have a load-bearing, skeleton-like supporting structure, in which lightweight steel profiles are connected to each other or to a thin metal sheet which forms the outer cladding using known welding processes. In these constructions, cross beams are also arranged underneath the underframe, which receive the pivot pins which are supported in the bogie. Typically, two cross beams are assigned to a coach body, close to the ends.

For the supporting structure and the cladding, in addition to steel and lightweight steel profiles and thin metal sheets, lightweight and corrosion-resistant materials made of aluminium or aluminium alloys are increasingly being used.

In addition to the conventional skeleton-type design, efforts have been made for many years to bring alternative construction principles into practice, in particular for the roof and side wall assemblies.

A body for a vehicle and a vehicle equipped with this body is known from GB 2 030 934 A.

The body there consists of modular subsegments which are connected to each other adjoining such that the segment modules at the same time form a portion of the body roof. For this, the subsegments have an angled extension.

In order to give the body the necessary strength, the individual modules are each installed in a superimposed form. Through the use of conventional construction materials, such as steel, signs of severe corrosion form in the overlap or joint area of the adjoining subsegments or segment modules. The prefabrication of the three-dimensionally shaped subsegments and of the profiles connecting them also requires high manufacturing accuracy.

During welding of the subsegments to each other, or to the profiles connecting them, comparatively large quantities of heat are introduced into the construction parts, which leads to more severe warping and to manufacturing inaccuracies resulting therefrom. Likewise, the structure is weakened due to the comparatively large heat affected zone. The undesired input of heat also regularly results in buckling or deformation of the thin-walled segment modules forming the outer skin of the coach body. These areas with the significant deformations must be laboriously re-worked through the further input of heat and the input of mechanical energy (normalizing, stress relieving, straightening). In addition, as a rule it is necessary to trowel and to grind the visible outer surfaces laboriously in order to give the coach body an attractive overall impression.

If the segment modules are connected to each other or to the adjacent profiles by screwed or riveted connections, the danger of crevice corrosion in the connection zone is greatly increased thereby. As the connecting segments used and the segment modules additionally consist of different steels or steel alloys, the premature formation of contact corrosion can result.

EP 0926036 A1 describes a coach body for high-speed trains in a differential design, which is formed of a base plate, a roof, end walls and side walls, wherein a side wall can be formed of sections arranged along the longitudinal axis of the coach body which consist in each case of a one-part hollow-chamber profile made of fibre-reinforced plastic, wherein the hollow-chamber profile is preferably designed such that the rigidity of the coach body is increased. Base plate, end walls and longitudinal beams are formed of extruded aluminium profiles, whereby the susceptibility to corrosion is again increased disadvantageously.

In order to reduce the overall mass of the coach body, the modular-constructed, functionally integrated coach body has a high proportion of fibre-plastic composite materials (FRP materials) and hybrid materials.

Because of the multiaxial load situation to be expected in the area of the coach body, the coupling modules specifically are manufactured as a metal or FRP-hybrid structure.

In DE 11 2013 002 072 T5 a rail vehicle body structure is described which, among other things, provides an underframe structure with a plurality of longitudinal beams. However, only the two outer longitudinal beams are designed continuous here. Central longitudinal beams which extend between the two longitudinal beams only reach from the respective ends of the coach section to behind the cross beam, thus over approx. a quarter of the overall length of the coach. The central longitudinal beams serve in particular to transmit force to the cross beams. These forces are the tensile and compressive forces of normal operation. For this, coupler supports are provided at the ends of the coach sections which transmit forces directly to the central longitudinal beams. The cross beams are screwed to the outer and to the central longitudinal beams. In order to distribute the force transmission better, the cross beams have an increased extent along the longitudinal beams in the screwing areas.

Further embodiments of underframes for rail vehicles are known from DE 10 2012 214 162 A1, which also reveals metallic connecting elements as load distribution elements for connecting lower longitudinal beams to a coach body.

SUMMARY

An aim of the present development for rail vehicles for transporting passengers, in particular for use in short distance operation, such as in underground and suburban railways, is to develop the latter such that the load capacity of the rail vehicles is increased with an unchanged overall mass compared with the known solutions from the state of the art, i.e. the structural mass of the coach body is reduced.

For this fibre composite materials are being used to an ever greater extent, also in the field of components subjected to large forces.

The object is to propose a suitable construction for the transmission of force from a cross beam into fibre composite structures, in particular into the longitudinal beams of a coach body, which consist of fibre composite material.

The coach body is formed at least partly of fibre-reinforced plastic composite materials, particularly preferably carbon-fibre composite materials, in order to reduce further the structural mass compared with a coach body according to the state of the art. The percentage by weight of fibre-reinforced plastics in the coach body is preferably up to 85%, particularly preferably more than 66%. The fibre-reinforced plastic preferably selectively comprises thermoplastics or thermosetting plastics, particularly preferably epoxy resins, unsaturated polyester resins, PU resins, vinyl ester resins or phenolic resins, as matrix material.

The at least partial manufacture of the coach body from fibre-reinforced plastics advantageously results in a beneficial reduction of the structural mass of the coach body, whereby the load capacity during operation can be increased. Advantageously, the use of FRP materials furthermore results in both significantly reduced maintenance costs and a significantly reduced susceptibility to corrosion. Advantageously, the manufacture in segments in each case of identical base, roof and side wall segments makes it possible to use common manufacturing methods and tools for fibre-reinforced plastics and, associated with this, allows the flexible adaptation e.g. to the length of a coach body according to the invention. Furthermore, the coach body is designed pressure-tight.

The coach body comprises at least the assemblies side wall, roof, base, end wall and in each case two lower and upper longitudinal beams running continuously in the longitudinal direction over the entire length of the coach body as well as, optionally, a head module.

The side wall, roof and base segments of the individual assemblies are particularly preferably designed plate-, shell- or half-shell-shaped. The plate-, shell- or half-shell-shaped roof and base segments are connected to the upper or the lower longitudinal beams, respectively, in a friction- and/or positive-locking and/or material-bonded manner. The plate-, shell- or half-shell-shaped side wall segments are connected to the vertically arranged door pillars as well as to the upper and lower longitudinal beams in a friction- and/or positive-locking and/or material-bonded manner. The end wall is designed plate-, shell- or half-shell-shaped.

The base of the coach body forms the interface between the passengers and the coach body. This is preferably constructed of individual base segments and at least one end cross-member. The base segments are preferably formed plate-shaped and bridge the spacing between the two lower longitudinal beams.

The end cross-members of the base assembly preferably form the termination of the coach body on both sides, connect the side walls to each other via the lower longitudinal beams and serve among other things to hold the longitudinal section of the cross beam, which conducts the coupling forces which are introduced into the lower longitudinal beams of the coach body.

The end cross-member is preferably formed of at least one FRP material the fibres of which are preferably oriented multiaxially, particularly preferably bidirectionally.

The coach body has two upper and two lower longitudinal beams, wherein the upper and lower longitudinal beams are each arranged over the entire length of the coach body. The upper and lower longitudinal beams preferably each terminate with the side wall.

The upper and lower longitudinal beams are preferably formed as multi-chamber hollow profiles made of an FRP material, preferably a carbon-fibre reinforced plastic material, and thus contribute to the further reduction of the overall mass compared with common steel or aluminium profiles.

Furthermore, the multi-chamber hollow profiles of the upper and lower longitudinal beams advantageously serve to absorb the longitudinal forces introduced into the coach body.

The upper and lower longitudinal beams are preferably formed with at least two chambers, particularly preferably three to five chambers, which run continuously along the longitudinal axis of the longitudinal beams.

The upper and lower longitudinal beams particularly preferably have no separation points or joints perpendicular to the longitudinal axis of the coach body. The longitudinal beams are particularly preferably arranged as one-part components over the entire length of the coach body.

The chambers of the multi-chamber hollow profiles are particularly preferably surrounded by an outer wall. The outer wall particularly preferably consists of one or more plies of at least one FRP material. The chambers of the multi-chamber hollow profiles are particularly preferably separated from each other by webs, wherein the longitudinal axes of the webs are oriented parallel to the longitudinal axis of the longitudinal beams. The webs thus act as partition walls inside the multi-chamber hollow profiles, wherein the chambers preferably extend uninterrupted through the entire length of the longitudinal beam.

The fibre reinforcements of both the outer wall of the multi-chamber hollow profile and the webs between the individual chambers of the multi-chamber hollow profiles are preferably formed single- or multi-ply.

The fibres within the individual plies which form the outer wall of the multi-chamber hollow profile and the webs between the individual chambers of the multi-chamber hollow profiles are particularly preferably oriented unidirectionally or multiaxially, particularly preferably with a unidirectional or quadraxial orientation.

The ply structure both of the outer wall of the multi-chamber hollow profile and of the webs between the individual chambers of the multi-chamber hollow profiles is preferably produced alternately from individual plies with a unidirectional and a multiaxial, particularly preferably quadraxial, fibre orientation, wherein the individual plies with a multiaxial fibre orientation particularly preferably comprise woven fabrics.

The longitudinal beams are particularly preferably produced by means of the pultrusion process.

The cross beam for receiving pivot pins is connected to the lower longitudinal beams underneath the coach body.

The lower longitudinal beams are preferably connected directly to the individual base segments of the base assembly. The lower longitudinal beams produce the connection between the base and side wall segments.

The lower longitudinal beams are preferably formed as multi-chamber hollow profiles with a cross section which optionally varies over the length, with at least two chambers, particularly preferably with three chambers, which run continuously along the longitudinal axis of the longitudinal beams. The multi-chamber hollow profile of a lower longitudinal beam particularly preferably has two chambers at least in an area of the coach body. At least one of the chambers of the multi-chamber hollow profile of the lower longitudinal beams is particularly preferably formed in cross section as a right-angled polygon. The individual chambers of the lower longitudinal beams particularly preferably have polygonal cross sections, particularly preferably triangular and/or rectangular cross sections. The cross section of the chambers particularly preferably has rounded corners. The rounding of the corners preferably corresponds to the permissible bending radius of the reinforcing fibres. Alternatively, the cross section of one chamber has corners. Stringing the individual chambers together produces the profile of the lower longitudinal beams.

The object of making it possible to transmit force from a cross beam into fibre composite structures, in particular into the longitudinal beams of a coach section which consist of fibre composite material, is achieved according to the invention in that each of the two lower longitudinal beams has a smaller number of chambers in the portion of the lower longitudinal beams in which the cross beams are connected to the lower longitudinal beams. The slots produced by the reduction in the number of chambers serve for joining to the cross beam. The cross beam serves to support the coach body on the bogie.

The reduction in the number of chambers of the lower longitudinal beams is preferably achieved in a process step downstream of the pultrusion by machining manufacturing methods, e.g. milling.

The chamber of the lower longitudinal beam which is facing the intended installation position of the cross beam is preferably milled or opened using other suitable methods. The outer wall of this chamber is preferably removed such that a seamless transition into the web to the next chamber of the lower longitudinal beam forms. This web to the next chamber of the multi-chamber hollow profile of the lower longitudinal beam is used for fixing load distribution elements. By introducing the load into the named web it is advantageously achieved that the load transmission in the longitudinal direction of the respective lower longitudinal beam is realized inside the lower longitudinal beam via an otherwise undisturbed fibre reinforcement system (outside the section with the reduced number of chambers). The main load transmission of tensile and compressive forces during vehicle operation thus advantageously takes place inside the lower longitudinal beam. This advantageously prevents the tensile and compressive forces acting in the longitudinal direction of the lower longitudinal beam from supporting or causing deformation of the lower longitudinal beam. Further installations which are located underneath the base of the coach section are fixed to the outer wall of the lower longitudinal beam in the area where the number of chambers is not reduced. The respective load distribution elements thus engage in the web structure to which they are fixed as the only disturbances. Moreover, the load distribution elements are fixed closer to the neutral fibres of the respective lower longitudinal beam. This reduces the transmission of alternating bending moments which could lead to disadvantageous stress in the fixing area of the respective load distribution elements.

The coach body preferably has two cross beams via which it is supported on bogies. The cross beams absorb the load of the coach body at their lateral ends (seen in the longitudinal direction of the coach) or transmit the tensile and compressive forces during vehicle operation to the lower longitudinal beams by means of the load distribution elements. For this purpose, one or more load distribution elements are arranged on each lateral end of a cross beam. Each cross beam has a crossing section, which runs perpendicular to the lower longitudinal beams and connects them, as well as a longitudinal section, which runs from the crossing section in the direction of the closest end of the coach section to the end cross-member. The feeding-through or the connection to the end cross-member is effected with (preferably metallic) connecting elements which, as interface elements, make it possible to transmit the tensile and compressive forces during vehicle operation and in the event of a crash into the cross beam and from there into the lower longitudinal beams.

The load distribution elements are preferably designed as angle profiles which are fixed to the lower longitudinal beam in the area where the number of chambers is reduced using metallic connecting elements such as rivets, screws or bolts. The metallic load-introducing elements moreover provide openings via which the corresponding lateral end of the cross beam is fixed to the respective lower longitudinal beam in the area of the load-introducing elements. The load distribution elements preferably consist of metal, particularly preferably of steel or titanium.

It has proved to be disadvantageous to perform the force transmission from the cross beams to the lower longitudinal beams in the longitudinal direction thereof only through the metallic connecting elements with which the cross beams are fixed to the lower longitudinal beams. The resulting alternating stress can lead to damage in long-term operation.

For this reason according to the invention the respective lateral end of the crossing section of the cross beam has at least one toothing which engages in the corresponding ideally shaped toothing on a load distribution element. Optionally, several toothings of a lateral end of a cross beam can correspond to the toothings of one load distribution element or several different load distribution elements on the same lower longitudinal beam. The flanks of the teeth of the toothings are oriented perpendicular to the longitudinal axes of the lower longitudinal beams.

Since an inclination of the toothings would lead to force components which stress the connection between load distribution element and cross beam, the toothings preferably have perpendicular flanks and horizontal top surfaces. The toothings of cross beam and load distribution element are thus preferably designed in the manner of two toothed racks with cuboid teeth supported one on the other. This advantageously ensures the separation of the horizontal forces (tensile and compressive forces during vehicle operation) and vertical forces (load force of the coach section on the cross beam).

The longitudinal section of the cross beam extends to the respective end cross-member in which it is supported. It is preferably fed through the end cross-member or ends in it. The end piece, in the longitudinal direction of the coach, of the longitudinal section of the cross beam provides an interface for fixing a coupling to connect the following coach or alternatively an interface for fixing the crash pass-through conduction element of the head section. For this, the end piece in the longitudinal direction of the coach is preferably designed forked and has a common installation plate at the forked ends as interface. Via the crash pass-through conduction element, the forces from the central buffer coupling of the head section are transmitted to the end piece in the longitudinal direction of the coach.

A cross beam is thus schematically T-shaped. The ends of the horizontal bar of the T shape are formed by the lateral ends of the crossing section of the cross beam, which are fixed in the respective lower longitudinal beams and connect them underneath the coach base. The lower end of the vertical bar of the T shape is formed by the interface for fixing the coupling or the crash pass-through conduction element to the end of the longitudinal section of the cross beam. This section of the cross beam conducts the forces from the coupling into the two longitudinal beams. In a further preferred embodiment, the T shape is modified into a Y shape, wherein the analogous functions are assigned to the sections of this shape as in the case of the T shape.

The lateral ends of the crossing section of the cross beam are preferably widened in the longitudinal direction of the lower longitudinal beams in the area in which they engage in the load distribution elements in order to be able to transmit the forces over a larger surface area.

The cross beam which transmits the tensile and compressive forces to following coaches can optionally have a reinforcement of the section which forms the interface for fixing the coupling. For this, a stiffener in the form of a profile is preferably formed on the section which reaches from the coupling to the section of the cross beam which connects the two load distribution elements.

The cross beam preferably consists entirely of metal, preferably of steel or titanium.

Moreover, the cross beam has openings for connecting the air springs and the pin for supporting in the bogie. The further installation and assembly provisions known from the state of the art are also possible. The specification of material thickness, the stiffeners and similar parameters which serve to guarantee stiffness, force transmission capability and to fulfill further technical parameters of train operation are determined by a person skilled in the art in the course of the design using known methods of computer-aided design and computer-aided construction and simulation.

BRIEF DESCRIPTION OF THE DRAWINGS

Embodiment examples of the invention are explained below with reference to some figures.

DETAILED DESCRIPTION

Figure 1:
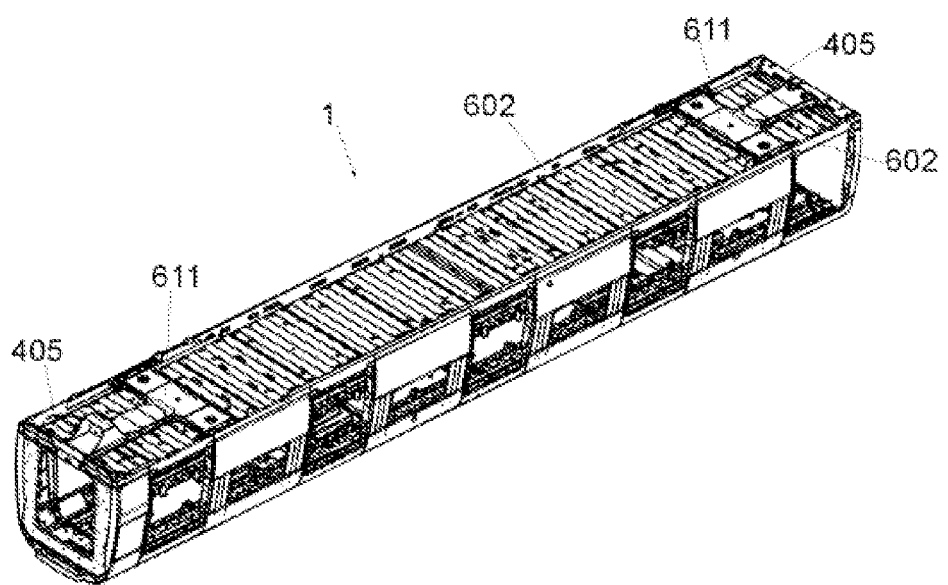
FIG. 1 perspective view of the underside of the coach body.

FIG. 1 shows the underside of the coach body 1 in a perspective view. The positioning of the lower longitudinal beams 602, the cross beams 611 which connect the longitudinal beams 602 at two points close to the coach ends, and the end cross-members 405 which terminate the longitudinal beams 602 at the coach ends, can be seen.

Figure 2:
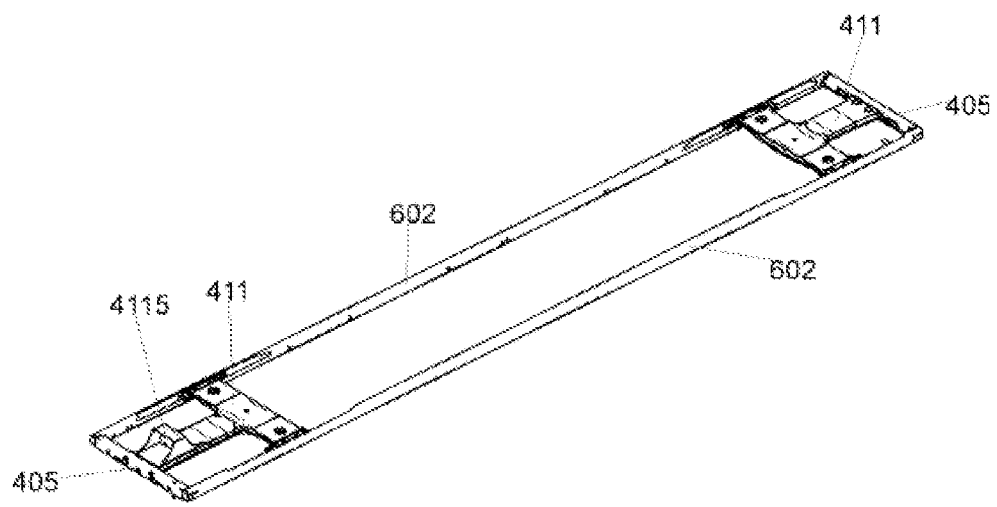
FIG. 2 perspective view of the underframe of the coach body.

FIG. 2 shows sections of the underframe, which here consists of the longitudinal beams 602, the cross beams 411 and the end cross-members 405. One of the two cross beams 411 has an additional stiffener 4115. These stiffeners are preferably provided in the case of cross beams 411 which conduct coupling forces to following coaches.

Figure 3:
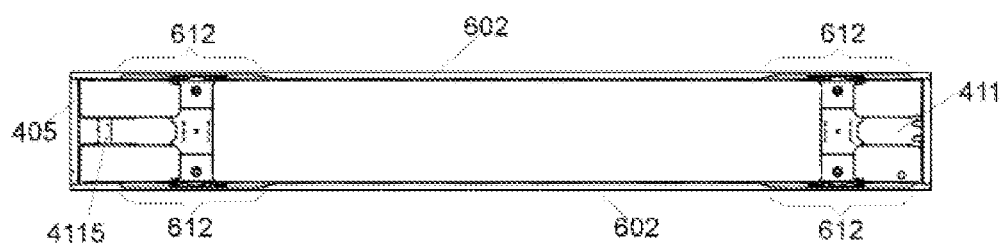
FIG. 3 top view onto the underframe of the coach body.

FIG. 3 shows the underframe according to FIG. 2 in the view from below, i.e. from the side from which the cross beams 411 are installed on the lower longitudinal beams 602. In the sections 612 the number of chambers of the lower longitudinal beams 602 is reduced. The load distribution elements are fixed in these sections 612.

Figure 4:
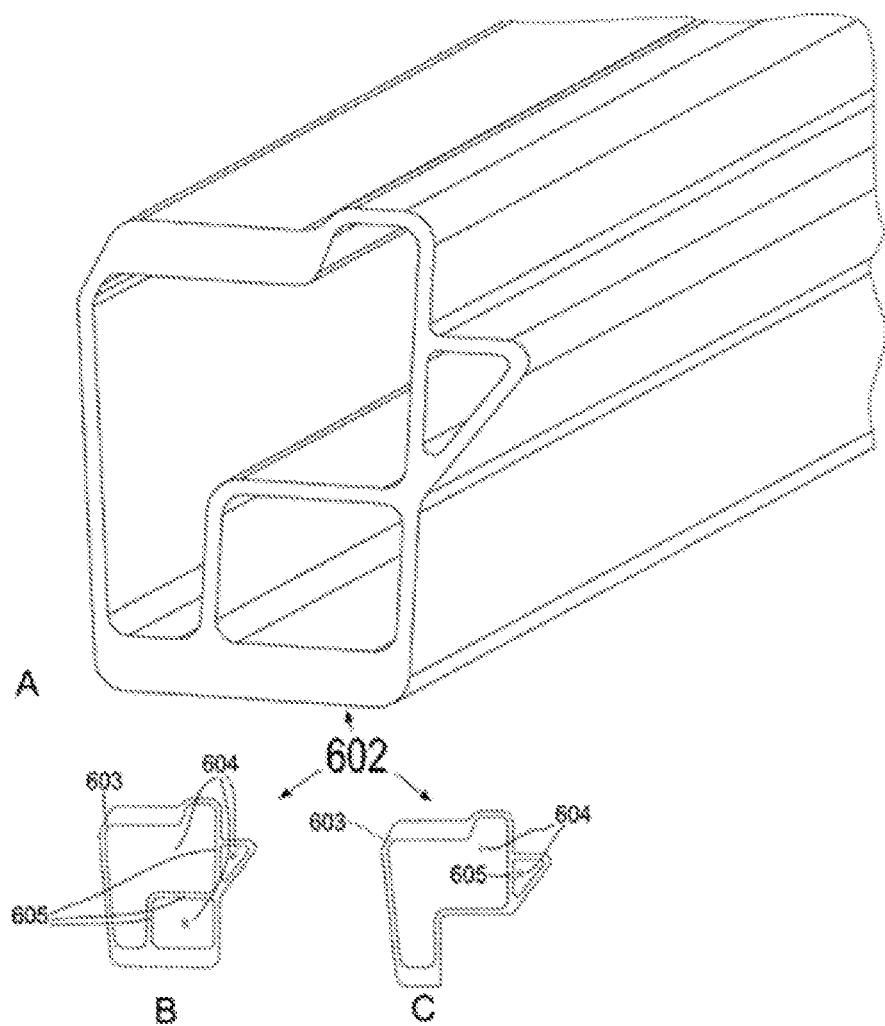
FIG. 4 detail view of a solebar in cross section.

FIG. 4, drawings A to C show the cross section of a lower longitudinal beam 602. The lower longitudinal beams 602 are produced in a continuous hybrid pultrusion process (e.g. pullwinding or pullbraiding process) with three cores and with a cross section constant over the length of 21 m. The lower longitudinal beam 602 has three hollow chambers 604 with polygonal cross sections labelled with the Roman numerals I to III, wherein one chamber III is designed with a triangular cross section and two chambers (I, II) are designed with rectangular cross sections and in each case rounded corners 603. The outer wall 606 and the webs 605 between the individual chambers 604 are each formed of 4 plies of quadraxial non-crimp fabric with an individual thickness of 1.8 mm and a fibre orientation of 0°, −45°, +45° and 90°. Load-bearing areas of the lower longitudinal beam 602, the top chord 607 and the bottom chord 608, have a differentiated ply structure.

In an embodiment example, a lower longitudinal beam 602 has dimensions of 21030 mm×215 mm×232 mm (length×width×height) and a mass of approx. 370 kg.

Figure 5:
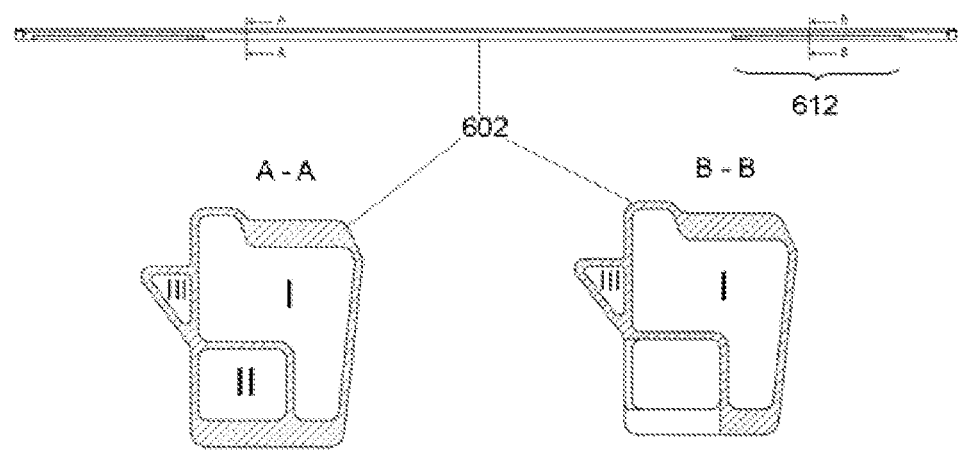
FIG. 5 perspective view of a solebar and cross sections at various points of the solebar.

FIG. 5 illustrates the position of the section 612 on the lower longitudinal beam 602 (upper drawing), in which the number of chambers of the lower longitudinal beam 602 has been reduced. In this section (section through B~ B) the load distribution element is fixed to the now exposed web of the previous chamber II. Since the load distribution element has a right-angled cross section (see FIG. 6), both webs are used for the fixing. In section through Ã A the cross section of the lower longitudinal beam 602 outside the fixing section of the load distribution elements is represented by way of example.

Figure 6:
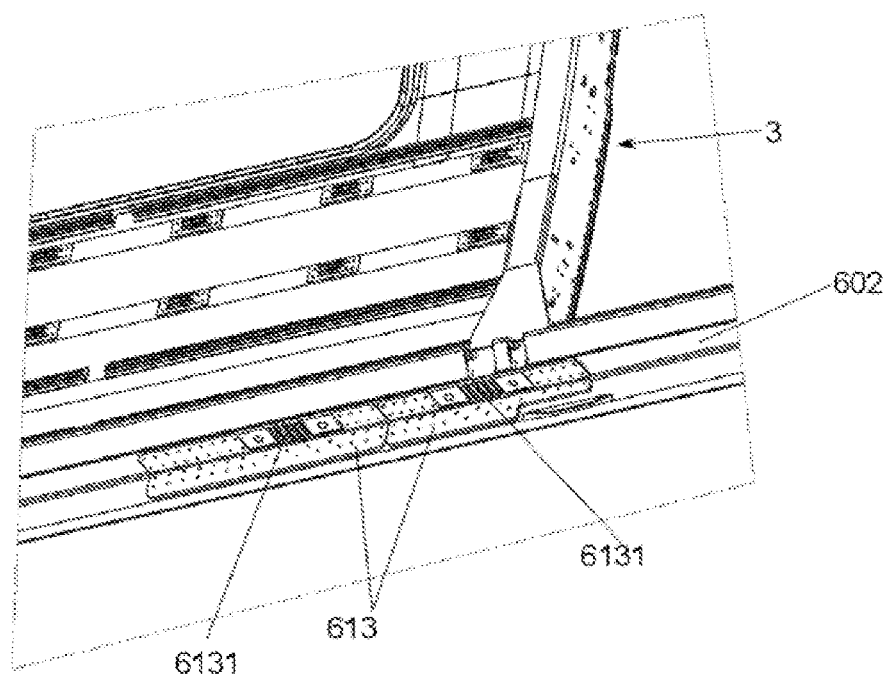
FIG. 6 perspective view of the positioning of the load distribution elements on a lower longitudinal beam.

FIG. 6 shows the device of the load distribution element 613 on the lower longitudinal beam 602 in a perspective representation. The side wall 3 of the coach section is indicated. The representation shows two load-introducing elements 613, which each have a toothed section 6131.

Figure 7:
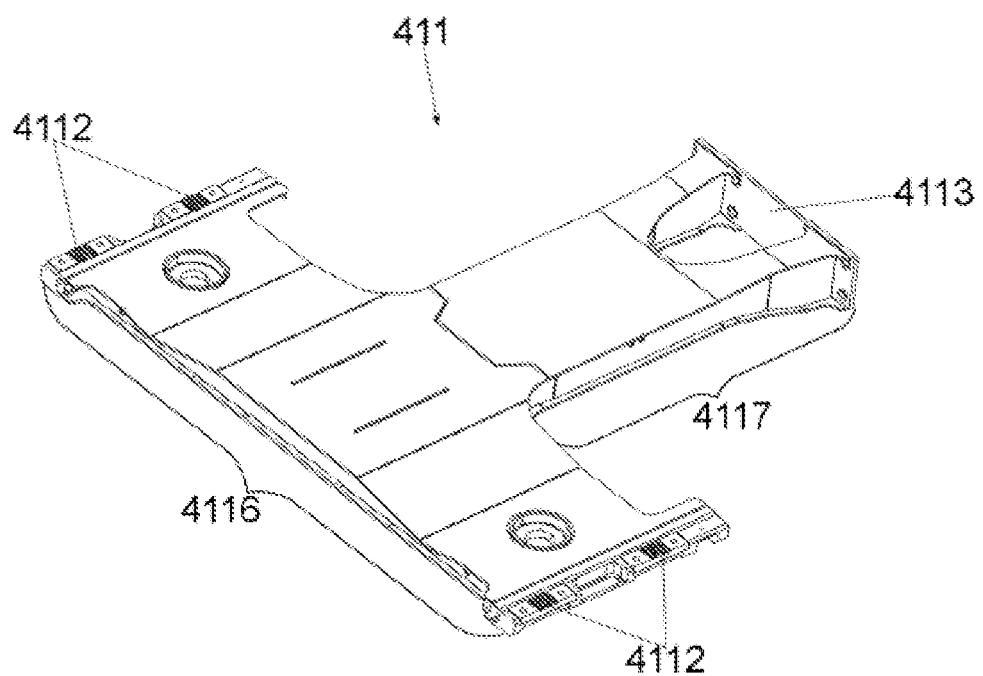
FIG. 7 perspective view of a cross beam in the embodiment for the coach end with a head section.

FIG. 7 shows the cross beam 411 in a perspective view. The cross beam 411 has a crossing section 4116 and a longitudinal section 4117. The cross beam 411 engages by means of the toothings 4112 at the ends of the crossing section 4116 in the corresponding toothings of the load distribution elements on the lower longitudinal beams (not represented). The connection to the coupling in the area of the end cross-member is produced via the interface 4113.

Figure 8:
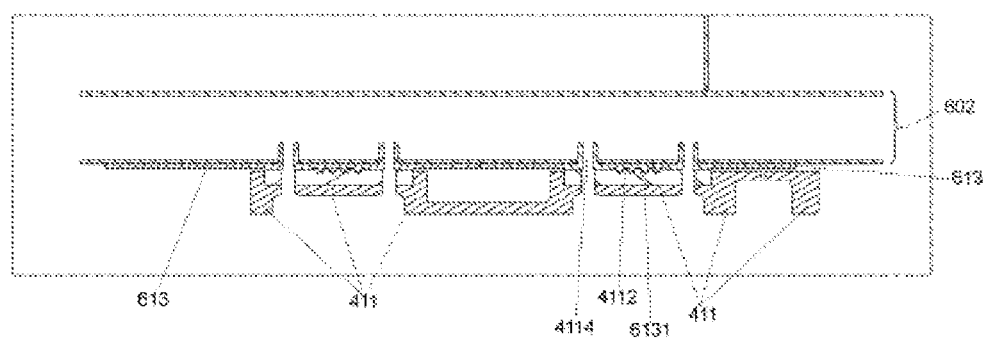
FIG. 8 section through the device of the ends of the cross beam at the load distribution elements and at the lower longitudinal beam.

FIG. 8 illustrates the device of load distribution element 613 and cross beam 411 on the lower longitudinal beam 602. A section through parallel to the longitudinal axis of the lower longitudinal beam 602 in the area of the fixing openings 4112 is represented. The toothed areas 6131 of the load distribution element 613 and the toothed areas 4112 of the cross beam 411 engage in each other in an ideally shaped manner. The cross beam 411 is fixed through the openings 4114, through which corresponding retaining bolts can be fed.

REFERENCE NUMBERS

1 coach body
3 side wall
405 end cross-member
410 feed-through
411 cross beam 4112 toothed area of the cross beam
4113 interface for connecting the coach coupling
4114 opening for feeding through connecting elements
4115 stiffener of the cross beam
4116 crossing section of the cross beam
4117 longitudinal section of the cross beam
602 lower longitudinal beam
603 rounded corner
604 hollow chamber (polygonal)
605 web
606 outer wall of the longitudinal beam
607 top chord
608 bottom chord
609 filling area
610 filling spandrel
611 interplies
612 section of the lower longitudinal beam where the number of chambers is reduced
613 load distribution element
6131 toothed area of the load distribution element

The invention claimed is:

1. A combined device having a device for connecting a cross beam for receiving pivot pins and two lower longitudinal beams of a coach body for a rail vehicle, wherein the cross beam has a crossing section which connects the two longitudinal beams to each other in the area of the connection, and a longitudinal section which extends to the front of the next coach, and the lower longitudinal beams extend the entire length of the coach body and are formed as a multi-chamber hollow profile from a fibre composite material, the combined device comprises:

the number of chambers in the multi-chamber hollow profile is smaller than the number of chambers in such a way that the webs to the adjacent chambers are exposed;

one load distribution element or several load distribution elements are fixable to one or more of the exposed webs;

the load distribution elements have toothed sections which are engageable with matched counter pieces at ends of the crossing section of the cross beam; and the cross beam is fixable by means of metallic connecting elements which protrude through the load distribution elements into one or more chambers of the respective lower longitudinal beam.

2. The combined device according to claim 1, wherein the lower longitudinal beams are arranged on the lower lateral edges of the coach body.

3. The combined device according to claim 2, wherein the load distribution elements are fixed to the lower longitudinal beam with the metallic connecting elements.

4. The combined device according to claim 2, wherein the load distribution elements have an angled cross section and are thus fixed to at least two webs, or the load distribution elements have an angled cross section and are thus fixed to at least one web and the outer wall of the lower longitudinal beam.

5. The combined device according to claim 2, wherein an end of the longitudinal section of the cross beam is supported in an end cross-member at an end of the coach body, wherein the end cross-member connects ends of the two lower longitudinal beams.

6. The combined device according to claim 2, wherein a first type of cross beam which is designed for transmitting the coupling loading to the following coach has an interface for accommodating a coupling at an end of the longitudinal section which extends to the front of the next coach.

7. The combined device according to claim 1, wherein the load distribution elements have an angled cross section and are thus fixed to at least two webs, or the load distribution elements have an angled cross section and are thus fixed to at least one web and the outer wall of the lower longitudinal beam.

8. The combined device according to claim 7, wherein the load distribution elements are fixed to the lower longitudinal beam with the metallic connecting elements.

9. The combined device according to claim 7, wherein an end of the longitudinal section of the cross beam is supported in an end cross-member at an end of the coach body, wherein the end cross-member connects ends of the two lower longitudinal beams.

10. The combined device according to claim 7, wherein a first type of cross beam which is designed for transmitting the coupling loading to the following coach has an interface for accommodating a coupling at an end of the longitudinal section which extends to the front of the next coach.

11. The combined device according to claim 1, wherein the load distribution elements are fixed to the lower longitudinal beam with the metallic connecting elements.

12. The combined device according to claim 11, wherein an end of the longitudinal section of the cross beam is supported in an end cross-member at an end of the coach body, wherein the end cross-member connects ends of the two lower longitudinal beams.

13. The combined device according to claim 11, wherein a first type of cross beam which is designed for transmitting the coupling loading to the following coach has an interface for accommodating a coupling at an end of the longitudinal section which extends to the front of the next coach.

14. The combined device according to claim 1, wherein an end of the longitudinal section of the cross beam is supported in an end cross-member at an end of the coach body, wherein the end cross-member connects ends of the two lower longitudinal beams.

15. The combined device according to claim 14, wherein a first type of cross beam which is designed for transmitting the coupling loading to the following coach has an interface for accommodating a coupling at an end of the longitudinal section which extends to the front of the next coach.

16. The combined device according to claim 1, wherein a first type of cross beam which is designed for transmitting the coupling loading to the following coach has an interface for accommodating a coupling at an end of the longitudinal section which extends to the front of the next coach.

17. The combined device according to claim 16, wherein the first type of the cross beam has an additional reinforcing profile.

18. The combined device according to claim 17, wherein a second type of cross beam, which is directed towards a head section of the coach, has an interface for the connection of a crash pass-through conduction element at the end of the longitudinal section.

* * * * *